No. 11,727. Reissued Mar. 21, 1899.

M. E. WENDELL & T. S. WILES.

DAMPENING MACHINE.

(Application filed Apr. 23, 1897.)

3 Sheets—Sheet 1.

Witnesses:
L. C. Hills.
E. K. Bond

Inventors:
Menzo Edgar Wendell,
Thomas Shires Wiles.
by E. B. Stocking, Atty.

No. 11,727. Reissued Mar. 21, 1899.

M. E. WENDELL & T. S. WILES.

DAMPENING MACHINE.

(Application filed Apr. 23, 1897.)

3 Sheets—Sheet 2.

Witnesses:
L. C. Hills
C. H. Bond

Inventors
Menzo Edgar Wendell
Thomas Shires Wiles
by E. B. Stocking Atty.

No. 11,727. Reissued Mar. 21, 1899.

M. E. WENDELL & T. S. WILES.

DAMPENING MACHINE.

(Application filed Apr. 23, 1897.)

3 Sheets—Sheet 3.

Witnesses:

L. C. Hills

E. H. Bond

Inventors,

Menzo Edgar Wendell,

Thomas Shires Wiles.

by E. B. Stocking Atty.

UNITED STATES PATENT OFFICE.

MENZO EDGAR WENDELL, OF TROY, AND THOMAS SHIRES WILES, OF ALBANY, NEW YORK.

DAMPENING-MACHINE.

SPECIFICATION forming part of Reissued Letters Patent No. 11,727, dated March 21, 1899.

Original No. 401,770, dated April 23, 1889. Application for reissue filed April 23, 1897. Serial No. 633,551.

*To all whom it may concern:*

Be it known that we, MENZO EDGAR WENDELL, residing at Troy, in the county of Rensselaer, and THOMAS SHIRES WILES, residing at Albany, in the county of Albany, State of New York, citizens of the United States, have invented certain new and useful Improvements in Dampening-Machines, of which the following is a specification, reference being had therein to the accompanying drawings, in which—

Figure 1:
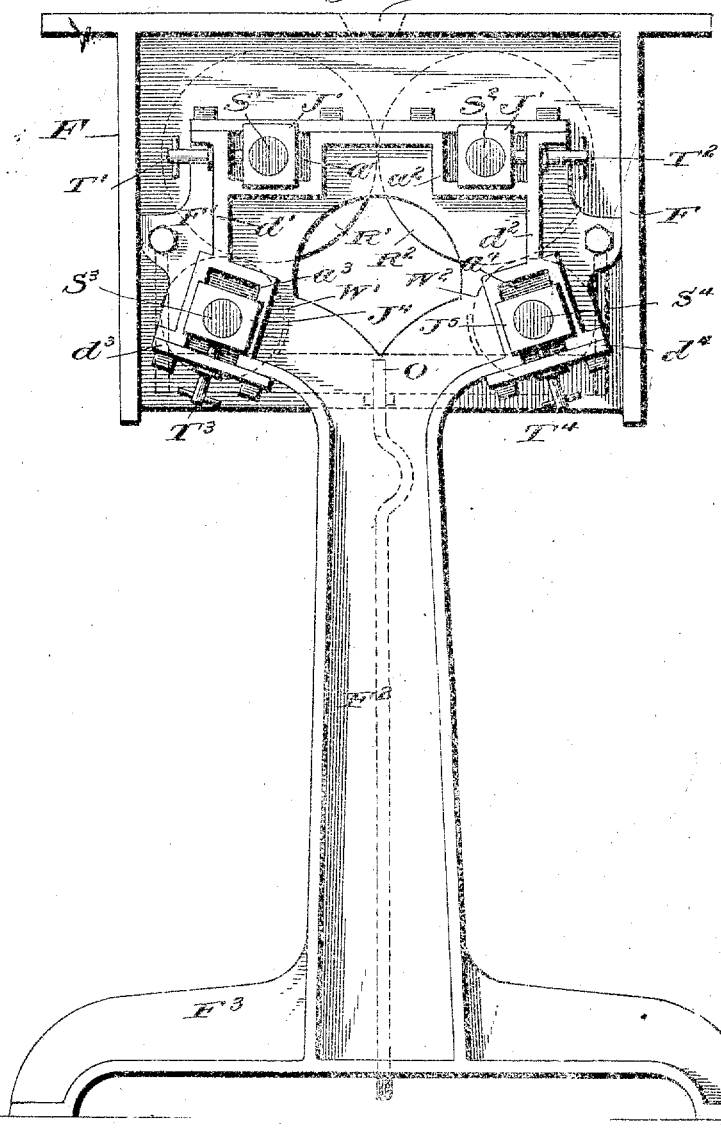
Figure 2:
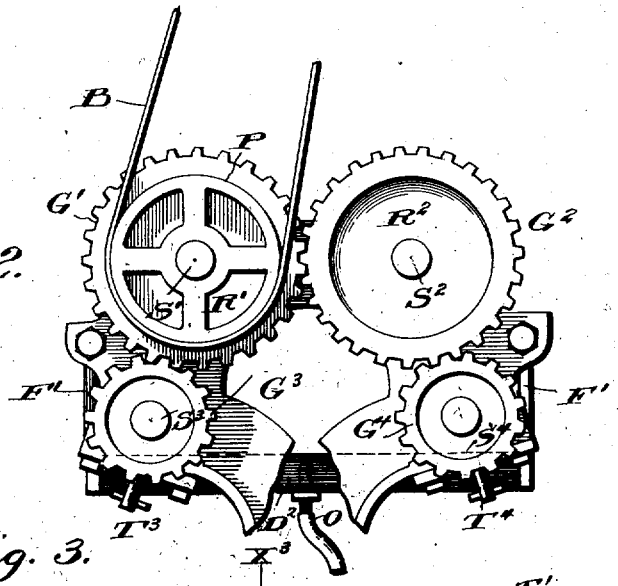
Figure 3:
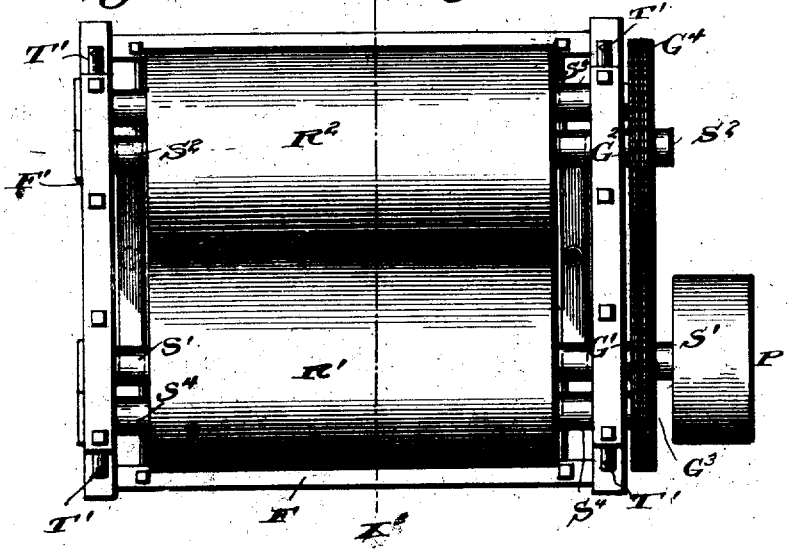
Figure 4:
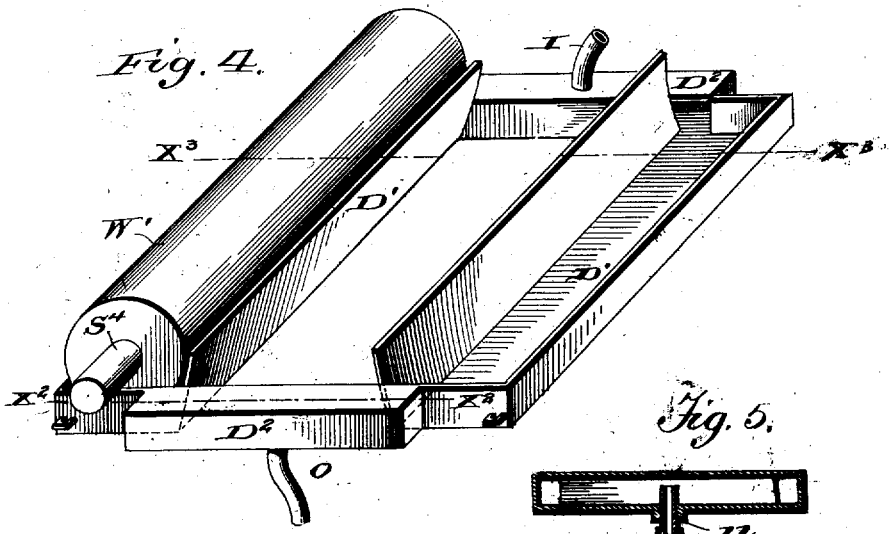
Figure 5:
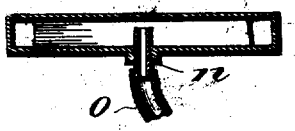
Figure 6:
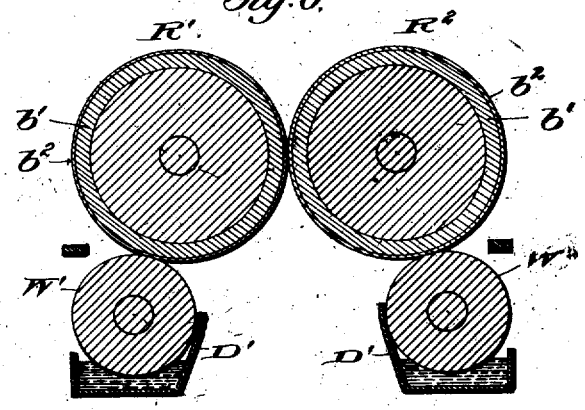

Figure 1 is an end elevation of a dampening-machine constructed in accordance with our invention. Fig. 2 is an end elevation showing the gearing employed. Fig. 3 is a plan. Fig. 4 is a perspective of the water-troughs and one of the water-supply rollers. Fig. 5 is a section on the line $X^2$ of Fig. 4, and Fig. 6 is a section on the line $X^3$ of Figs. 3 and 4.

Like letters of reference refer to like parts in all the figures of the drawings.

The object of our invention is to provide a machine suitable for dampening collars, cuffs, and other articles during the process of laundering the same. One of the requisites of the problem is to secure the uniform application of a limited quantity of water; another, to provide for the passage through the machine of articles having seams, buttons, or other protrusions and yet to insure a uniformity in the dampening process, especially at and adjacent to said protrusions. It is also requisite that the successful machine should be capable of dampening large quantities of goods in a given time.

With these objects in view we have constructed a machine whereby they are attained; and our invention consists in the novel features of construction and arrangement hereinafter described, and particularly pointed out in the claims.

F', $F^2$, and $F^3$ represent one form of a suitable framework for supporting the operating parts of the machine, and F F represent a cover or table which may be employed in connection with the operative parts for the protection of the operator and support of goods to be operated upon and which may be slotted, as at $F^4$, for the passage of goods into the machine.

The framework is provided with horizontally-sliding bearings J', adjusted by bolts T' $T^2$ in recesses $a'$ $a^2$, and in said bearings are mounted the shafts S' $S^2$ of the dampening-rollers R' $R^2$ of the machine. Said framework is also provided with inclined recesses $a^3$ $a^4$ for the reception of sliding bearings $J^4$ $J^5$ for the shafts $S^3$ $S^4$ of the water-supply rollers W' $W^2$, these latter bearings being adjusted by the bolts $T^3$ $T^4$, threaded in bars $d^3$ $d^4$, while the bolts $T^2$ T' are threaded in the portions $d'$ $d^2$ of the frame.

D' represents a water-trough provided with a supply-pipe I and a discharge-pipe O, connected with the trough by a nipple $n$, which may be adjusted to project a desired distance upwardly in the trough-connecting passages $D^2$, so as to determine the depth of the water in the troughs D', in which the water-supply rollers W' $W^2$ revolve.

The dampening-rollers R' $R^2$ are arranged over the water-supply rollers W' $W^2$ and are adjustable toward and from each other. Each water-supply roller W' $W^2$ is also adjustable toward and from one of the dampening-rollers R' $R^2$, and an unobstructed passage exists, whereby goods after being dampened may be delivered unassisted into any suitable receptacle below the dampening-rollers. Each of the dampening-rollers consists in this instance of a shaft, a core of wood, an elastic or yielding non-absorbing bed or body $b'$, mounted on the wood, and a thin outer covering $b^2$, of textile fabric. The purpose of the thin textile covering is to absorb and distribute moisture, and it may consist of cotton, woolen, or other absorbent fabric, provided the total thickness or absorbent capacity of the covering as a whole is not so great as to absorb or take up water in such unmanageable quantity as to more or less effectually wash out, displace, or remove the starch from the articles, whereby when ironed a defective finish would result. The word "thin" is used herein to indicate absorbent capacity rather than measurement. The body of the dampening-roller itself may be described as being essentially of any non-absorbing elastic substance. In this instance rubber is employed, and the purpose of the wooden core is simply to economize in the quantity of rubber necessary in a roller of a desired diameter.

By arranging two dampening-rollers of the character described to run in connection with each other the elasticity thereof acts during the passage of seams or other protrusions in that each roller conforms to the irregularity of the surface of the article coming in contact therewith. In other words, both surfaces of an article are uniformly moistened, and an excess of protrusions upon one surface is compensated for by the elasticity of the roller in contact with its opposite surface. Separating the water-supply rollers and arranging the line of contact of the dampening-rollers between the supply-rollers also provides an unobstructed passage for the dampened goods through the machine and into any suitable receptacle placed below the dampening-rollers to receive the goods.

In dampening very thin articles a very slight moisture is required, while thicker articles—for example, starched shirts—require so much moisture that an actual body of water is presented to the same by the dampening-rollers. To perform these extreme functions, the adjustment of the various rollers is utilized. By increasing the pressure of the water-supply rollers against the dampening-rollers a decreased quantity of water is absorbed by the dampening-roller coverings, and by decreasing the pressure of the water-supply rollers against the dampening-rollers an increased quantity of water is absorbed by their coverings, and by increasing the pressure of the dampening-rollers against the article being dampened and against each other an increased quantity of moisture, or if the pressure be sufficient a body of water, is presented by the dampening-rollers to the article, while decreasing the pressure of the dampening-rollers against the article causes the coverings to present a decreased quantity of moisture to the article. Therefore by changing the adjustment of the water-supply rollers and of the dampening-rollers any desired degree of dampness may be produced in articles passed between the dampening-rollers, provided the covering of the dampening-rollers be not so thick or absorbent as to take up more water than can be controlled by a proper adjustment of the dampening and water-supply rollers.

The driving-belt B, mounted on the pulley P, secured to the shaft S', serves to operate the rollers through the medium of gears G', $G^2$, $G^3$, and $G^4$, as clearly shown in Fig. 2. It is apparent that any well-known equivalent for the gearing may be employed.

We do not broadly claim a roller having a rubber body or periphery and a woolen or other fabric cover as our invention, as such have been employed in wringer-rollers used for the purpose of expressing water and moisture from articles and for the purpose of preserving the rubber from undue wear, as shown by Patents No. 39,201, dated July 7, 1863, and No. 42,224, dated April 5, 1864. These wringer-rollers are not intended for imparting moisture to articles.

So far as we are aware we were the first to combine dampening-rollers with independent water-supply rollers, each independently adjustable, said dampening-rollers each being provided with a non-absorbent elastic body and with an outer absorbent covering of any material which is limited in its capacity to absorb only to a degree controllable by the adjustment of the rollers, as and for the purpose hereinbefore described. Therefore

What we claim is—

1. In a dampening-machine for laundry purposes, a pair of rollers each having a non-absorbent, elastic body or periphery, and an absorbent covering of limited capacity and arranged to run in connection with each other in combination with separated water-supply rollers and with means for regulating the contact pressure of said rollers, substantially as and for the purpose specified.

2. In a dampening-machine for laundry purposes, a pair of rollers each having a non-absorbent, elastic body or periphery and a thin, textile, covering and arranged to run in connection with each other, in combination with separated water-supply rollers, substantially as specified.

3. The combination of the rollers R' $R^2$, each having the rubber body or periphery $b'$ and thin, textile, coverings $b^2$, and arranged to run in connection with each other, the separated water-supply rollers W' $W^2$ the troughs D', connecting-troughs $D^2$, supply-pipe I, overflow-nipple $n$ and discharge-pipe O, substantially as specified.

4. The combination with the rollers R' $R^2$ arranged to run in connection with each other, having the non-absorbent, elastic bodies or peripheries $b'$ and thin, textile, coverings $b^2$, of the adjustable bearings J', the water-supply rollers W' $W^2$, the adjustable bearings $J^4$ $J^5$, and the troughs D' $D^2$, substantially as specified.

5. The combination with the two dampening-rollers R' $R^2$ each having a rubber body or periphery $b'$, and a thin, textile, covering $b^2$, running in connection with each other, of the supply-rollers W' $W^2$, each running in contact with one of the rollers R' $R^2$, and a suitable framework, substantially as specified.

In testimony whereof we affix our signatures in presence of two witnesses.

MENZO EDGAR WENDELL.
THOMAS SHIRES WILES.

Witnesses:
CHAS. F. WILES,
RICHARD H. ROBERTS.